US012235237B2

(12) United States Patent
Rick (10) Patent No.: US 12,235,237 B2
(45) Date of Patent: Feb. 25, 2025

(54) SQUARE WAVE VOLTAMMETRY VARIABLE ACQUISITION WINDOW

(71) Applicant: Hach Company, Loveland, CO (US)

(72) Inventor: David Langley Rick, Longmont, CO (US)

(73) Assignee: HACH COMPANY, Loveland, CO (US)

( * ) Notice: Subject to any disclaimer, the term of this patent is extended or adjusted under 35 U.S.C. 154(b) by 457 days.

(21) Appl. No.: 17/714,464

(22) Filed: Apr. 6, 2022

(65) Prior Publication Data

US 2023/0324334 A1    Oct. 12, 2023

(51) Int. Cl.
 *G01N 27/48* (2006.01)
 *G01N 27/49* (2006.01)

(52) U.S. Cl.
 CPC ............ *G01N 27/48* (2013.01); *G01N 27/49* (2013.01)

(58) Field of Classification Search
 None
 See application file for complete search history.

(56) References Cited

U.S. PATENT DOCUMENTS

2020/0400610 A1    12/2020 Rajasekharan et al.
2021/0341418 A1    11/2021 Salzer et al.

OTHER PUBLICATIONS

L. Ramaley & M.S. Krause, Jr., "Theory of Square Wave Voltammetry", Analytical Chemistry, 41(11): p. 1362-1365, Sep. 1969.*
J.G. Osteryoung & R.A. Osteryoung, "Square Wave Voltammetry", Analytical Chemistry, 57(1): p. 101A-110A, Jan. 1985.*
European Patent Office, International Search Report and Written Opinion, Jul. 4, 2023, 18 pages, European Patent Office.
Tim Paschkewitz, "Square Wave Foltammetry (SWV)", Apr. 24, 2020, 20 pages, Pine Research.
Marina Mlakar, "Determination of Titanium in Water Solutions", Electroanalysis 2004, Feb. 9, 2004, 7 pages, vol. 16, No. 3, WILEY-VCH Verlag GmbH & Co. KGaA, Weinheim.
Andrzej Baranski et al., "Fourier transform square-wave voltammetry", Journal of Electroanalytical Chemistry Aug. 8, 1994, 9 pages, vol. 373, No. 1-2, Elsevier Science S.A.

* cited by examiner

*Primary Examiner* — J. Christopher Ball
(74) *Attorney, Agent, or Firm* — Ference & Associates LLC (57) ABSTRACT

An embodiment provides a method for measuring a component of an aqueous sample using square wave modulation, including: introducing the aqueous sample to a chamber of a square wave modulation apparatus; applying a stimulus voltage step to the aqueous sample, wherein the stimulus voltage comprises a staircase voltage, wherein each step of the staircase voltage defines a group, wherein the group comprises one or more square wave modulation cycles; adjusting a time acquisition window, wherein the time acquisition window is a portion of each of the half cycle of the stimulus voltage; measuring a resultant current output resulting from the stimulus voltage within the time acquisition windows; and averaging the resultant current output across at least one or more cycles of each group. Other aspects are described and claimed.

20 Claims, 7 Drawing Sheets

SQUARE WAVE VOLTAMMETRY VARIABLE ACQUISITION WINDOW

FIELD

This application relates generally to measurement of a species in solution based on square wave voltammetry, and, more particularly, to voltammetry using a variable acquisition window.

BACKGROUND

Voltammetry is a class of techniques used in electrochemical measurement. It may involve applying a variable voltage between two electrodes in solution and recording a resulting current response, often measured at a third electrode. The resulting response current versus applied voltage curve yields useful information about the fluid sample being measured. A typical voltammogram exhibits one or more quasi-Gaussian response peaks in which the peak position is related to the redox potential of a chemical species in the solution being analyzed.

BRIEF SUMMARY

In summary, one embodiment provides a method for measuring a component of an aqueous sample using square wave modulation, comprising: introducing the aqueous sample to a chamber of a square wave modulation apparatus; applying a stimulus voltage step to the aqueous sample, wherein the stimulus voltage comprises a staircase voltage, wherein each step of the staircase voltage defines a group, wherein the group comprises one or more square wave modulation cycles; adjusting a time acquisition window, wherein the time acquisition window is a portion of each of the half cycle of the stimulus voltage; measuring a resultant current output resulting from the stimulus voltage within the time acquisition windows; and averaging the resultant current output across at least one or more cycles of each group.

Another embodiment provides a device for measuring a component of an aqueous sample using square wave modulation, comprising: a voltammetric electrode; at least one reference electrode; at least one counter electrode; and a memory storing instructions executable by a processor to: apply a stimulus voltage step to the aqueous sample, wherein the stimulus voltage comprises a staircase voltage, wherein each step of the staircase voltage defines a group, wherein the group comprises one or more square wave modulation cycles; adjusting a time acquisition window, wherein the time acquisition window is a portion of each of the half cycle of the stimulus voltage; measure a resultant current output resulting from the stimulus voltage within the time acquisition windows; and average the resultant current output across at least one or more cycles of each group.

A further embodiment provides a system for measuring a component of an aqueous sample using square wave modulation, comprising: a voltammetric electrode; at least one reference electrode; at least one counter electrode; and a storage device having code stored therewith, the code being executable by the processor and comprising: code that applies a stimulus voltage step to the aqueous sample, wherein the stimulus voltage comprises a staircase voltage, wherein each step of the staircase voltage defines a group, wherein the group comprises one or more square wave modulation cycles; code that adjusts a time acquisition window, wherein the time acquisition window is a portion of each of the half cycle of the stimulus voltage; code that measures a resultant current output resulting from the stimulus voltage within the time acquisition windows; and code that averages the resultant current output across at least one cycle of each group.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 2 illustrates an example square wave voltammetry sweep with an $f_{mod}$=30 Hz, a sub-multiple of $f_{line}$=60 Hz, illustrating rejection of alternating current power line noise in the signal and measurement curves are similar.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Conventional stimulus waveforms often involve step changes in voltage. In the simple case of Cyclic Voltammetry (CV) sweeps, the steps may be a consequence of what were originally analog ramp generation circuits being replaced by designs employing digital-to-analog converters (DAC's) to output a numerically generated ramp or triangle wave which approximates the continuous waveforms used historically.

The "stair-stepping" caused by finite converter resolution is generally of very small amplitude. Some instruments employ a combination of "oversampling" and analog low-pass filtering to interpolate between successive samples and remove the stair steps; the effectiveness of this depends on the ramp slope. In other commonly employed stimulus waveforms, much larger voltage steps are used intentionally. Staircase Voltammetry (SCV) intentionally traverses the desired voltage range in a few larger steps.

Square Wave Voltammetry (SWV) involves superimposing a square-wave modulation on top of a step continuous ramp or a step sequence. The modulation steps may be tens of millivolts in amplitude—much larger than the inherent DAC resolution. Instruments performing SWV scans commonly capture the current responses to the positive- and negative-going parts of the square wave modulation separately. Often, the latter is subtracted from the former to cancel a "background" response current. It should be noted that an instrument capable of SWV measurements may often be coerced to perform SCV measurements by setting the square wave amplitude to zero and logging either the positive or negate half cycle response alone instead of their difference. Many other stimulus waveforms involving step changes have been imagined and employed. The present invention is not limited to those described here; it applies to any stimulus waveform containing a series of periodic edge transitions.

Accordingly, the systems and methods described herein provide a technique for an enhancement of conventional SWV. It may be referred to as an adjustment of a time acquisition window. A time acquisition window may be adjusted for a forward and reverse portion of a protocol for SWV. The system and method may use a potentiostat in which the acquisition window's start and end delays, relative to a modulation edge, are each controllable by the user and are not fixed in relation to a modulation or step frequency, but rather adjustable as a percentage thereof. Alternatively, the start and end delays may be specified in any convenient units of time, with respect to one or more modulation edges. This instrument allows electrochemistry experiments to be benchmarked against the conventional "fixed window" potentiostat described herein, by adjusting the start and end timing. An optimal adjustment of the acquisition window position and length produces integrated current responses that are up to five times (5x) stronger than those obtained with conventional window timing. Also, the signal-to-noise ratio of the resulting SWV response curves may be correspondingly improved. This, together with SWV modulation frequency or SCV step rate, can be set independently for best line noise rejection, and offer a significant advantage over the conventional methods and allow new measurement applications in difficult environments.

Voltage steps may cause time-varying response currents. There may be an initial surge of current at the time of the step due to capacitive charging of the double-layer electrochemical capacitor at the electrode-fluid interface. This capacitive charging current decays exponentially. As the capacitive charging current dies away, a second current component dominates. This second, so-called Faradaic, current is a consequence of ion diffusion and its amplitude depends on the applied stimulus voltage in comparison to the activation potentials of the reactions occurring near the electrode-fluid interface. This dependency is the basis upon which fluid samples are commonly characterized in voltametric instruments.

To separate the Faradaic current from the capacitive charging current, it is common practice to measure the response current at some time delay after each edge transition. For example, a conventional laboratory potentiostat may integrate the SWV response current during the second and fourth quarters of each square wave cycle, and the current response during the first and third quarters may be ignored. The position and length of each "acquisition window" is fixed in relation to the square wave modulation period. When the same instrument is used in SCV mode, the response current is integrated during the second half of each step. In this mode, the acquisition window is fixed in relation to the step intervals.

Faradaic response current may also vary with time. Many electrochemistry experiments exhibit "diffusion limited" responses in accord with the theory of Cottrell. In these cases, the Faradaic current decreases as the inverse square root of time after each edge transition. Ideally, the acquisition window is positioned late enough for the (exponentially-decaying) capacitive charging component to be negligible, but early enough to measure the Faradaic current before it also falls too low for reliable observation. Skilled users of conventional potentiostats may choose the step interval or square wave modulation frequency to achieve this desired outcome.

In laboratory experiments, the step rate or square modulation frequency may be regarded as free parameters which the experimenter may adjust for optimal results. A conflict arises, though, if these experimental protocols are to be applied in heavy industrial or field measurement applications.

The Faradaic current responses observable using the methods under discussion tend to be small. The net difference current for SWV may be only a few tens of nanoamps in some experiments. Larger currents are observed using SCV, these being proportional to the step size, their magnitude may still be measurable in tens of microamps. Thus, both measurement protocols may be subject to interference from external noise sources, especially noise induced from alternating current (AC) power circuits. Electrochemists employ careful laboratory practice and a range of countermeasures to combat this problem, up to and including performing the experiments within carefully shielded enclosures. Such stringent measures may be impractical in field or factory measurement applications. At the same time, levels of electrical interference in a heavy industrial setting may be orders of magnitude higher than observed in a typical laboratory environment.

Careful choice of measurement settings can aid in mitigating power line related interference. For SCV experiments, integrating the response current over an acquisition window whose length is exactly equal to an integral number of power line cycles results in cancellation of the interference. Because the acquisition window is typically a fixed fraction of the step duration, the later must be adjusted to achieve a suitable window length. The technique of matching the acquisition window length to the power line period also works for SWV, but a less restrictive protocol is possible. Since SWV involves computing the difference in current responses for the positive and negative half cycles of a square wave excitation, it is advantageous to choose the square wave modulation frequency to be equal to (or some integer sub-multiple of) the AC line frequency. Doing so makes the line interference identical in both the positive and negative half-cycles, so it will be cancelled out in the subsequent subtraction. No special restrictions are needed on the acquisition window length or position, provided these are the same for both the positive and negative half-cycles.

The noise-cancelling strategies described herein may be an important tool for mitigating line-related interference, but they may limit a user because the modulation frequency can no longer be adjusted as a free parameter. For SWV, the modulation frequency must now be constrained according to the local power line frequency; for SCV, the step rate must be adjusted to create an acquisition window length that reject line frequency. Only discrete values may be suitable in either case and there is a maximum modulation frequency above which no power line rejection can be achieved. To relax these constraints, a new type of potentiostat is called for in which the acquisition window timing may be specified independently of a step rate or modulation frequency. The reader is also referred to commonly owned U.S. patent application Ser. No. 17/698,263, filed on Mar. 18, 2022, and entitled "REPEATED CYCLES SQUARE WAVE VOLTAMMETRY," the contents of which are incorporated by reference herein, which explains how the upper limit on the modulation frequency may be relaxed through use of repeated square wave cycles.

The problems explained above are worsened when studying certain classes of surface-bound reactions in which the reactive species are exhausted very quickly. A skilled laboratory chemist may program an ordinary potentiostat with a suitably fast step rate or modulation frequency. Alternatively, some potentiostats offers a choice of two SCV acquisition protocols: In "fast mode", a very short acquisition window occurs at the end of each "stair tread"; in "surface mode" it occupies the complete stair tread duration. The "fast mode" prioritizes rejection of capacitive charging current but is unsuited to study of many surface reactions, while "surface mode" reverses these priorities.

Consequently, there exists a need for an instrument in which the acquisition window starting point and duration can be adjusted to optimize the measurement of various fast surface reactions while substantially rejecting an initial charging current. Moreover, it should be clear to those skilled in the art that an instrument in which the acquisition window's start and end times are user-programmable could be used to separate the current responses of two or more simultaneous reactions having different decay rates.

In an embodiment, a potentiostat in which the acquisition window's start and end times are each controllable by the user and are not fixed in relation to a modulation or step frequency, but rather adjustable as a percentage thereof. This instrument allows electrochemistry experiments to be benchmarked against the conventional "fixed window" potentiostat described above. An optimal adjustment of the acquisition window position and length produces integrated current responses that are up to five times (5x) stronger than those obtained with conventional window timing and that the signal-to-noise ratio of the resulting SWV response curves may be correspondingly improved. This, together with SWV modulation frequency or SCV step rate can be set independently for best line noise rejection, offers a significant advantage over the present state of the art and will enable new measurement applications in difficult environments.

The illustrated example embodiments will be best understood by reference to the figures. The following description is intended only by way of example, and simply illustrates certain example embodiments.

Figure 1:
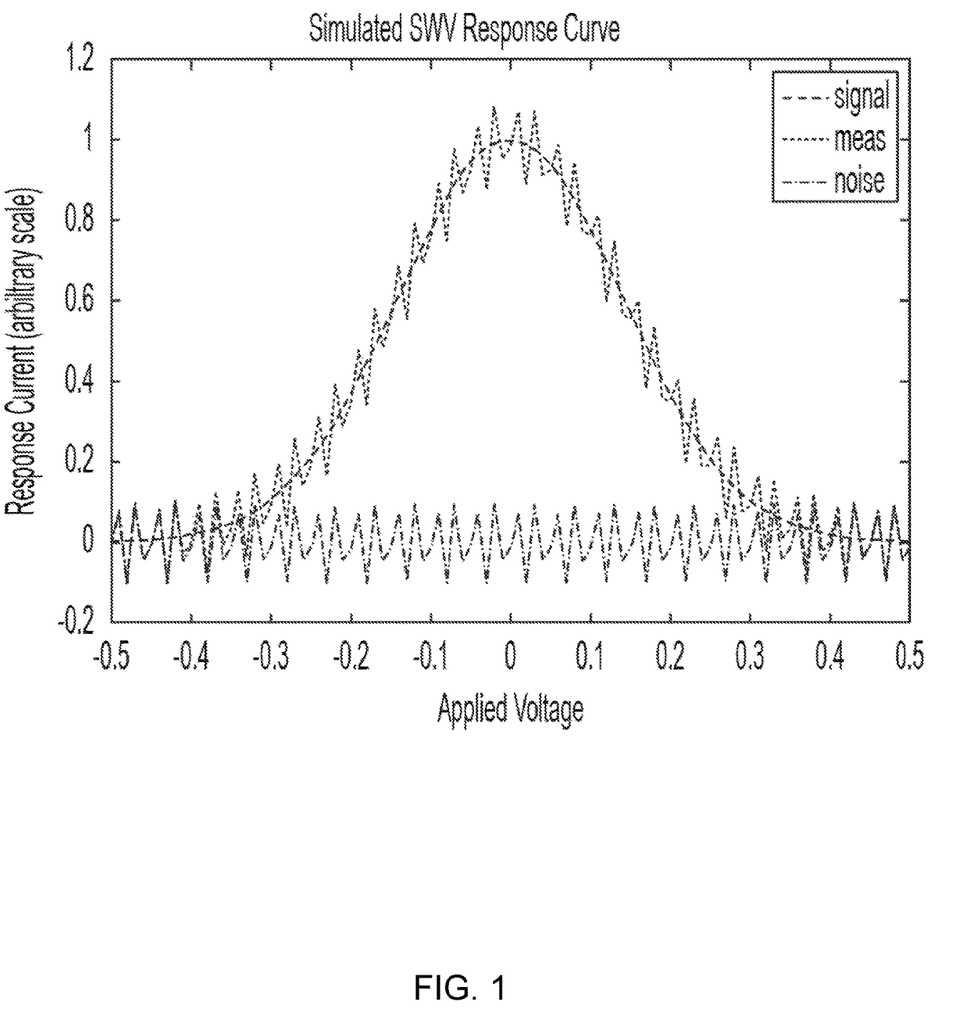
FIG. 1 illustrates an example simulation of the effect of alternating current power line interference at 60 Hz on a square wave voltage measurement. The example sweep illustrates 101 ramp steps spanning −0.5V to +0.5V, with $f_{mod}$=25 Hz.

Referring to FIG. 1, in an embodiment, a potential effect of power line interference, illustrates an idealized SWV response plot with and without additive AC noise. As an example, the AC interference may move the response peak by 30 mV. If this exemplar experiment were being used to measure a Nernstian pH response, this would result in an error of more than 0.5 pH.

Figure 2:
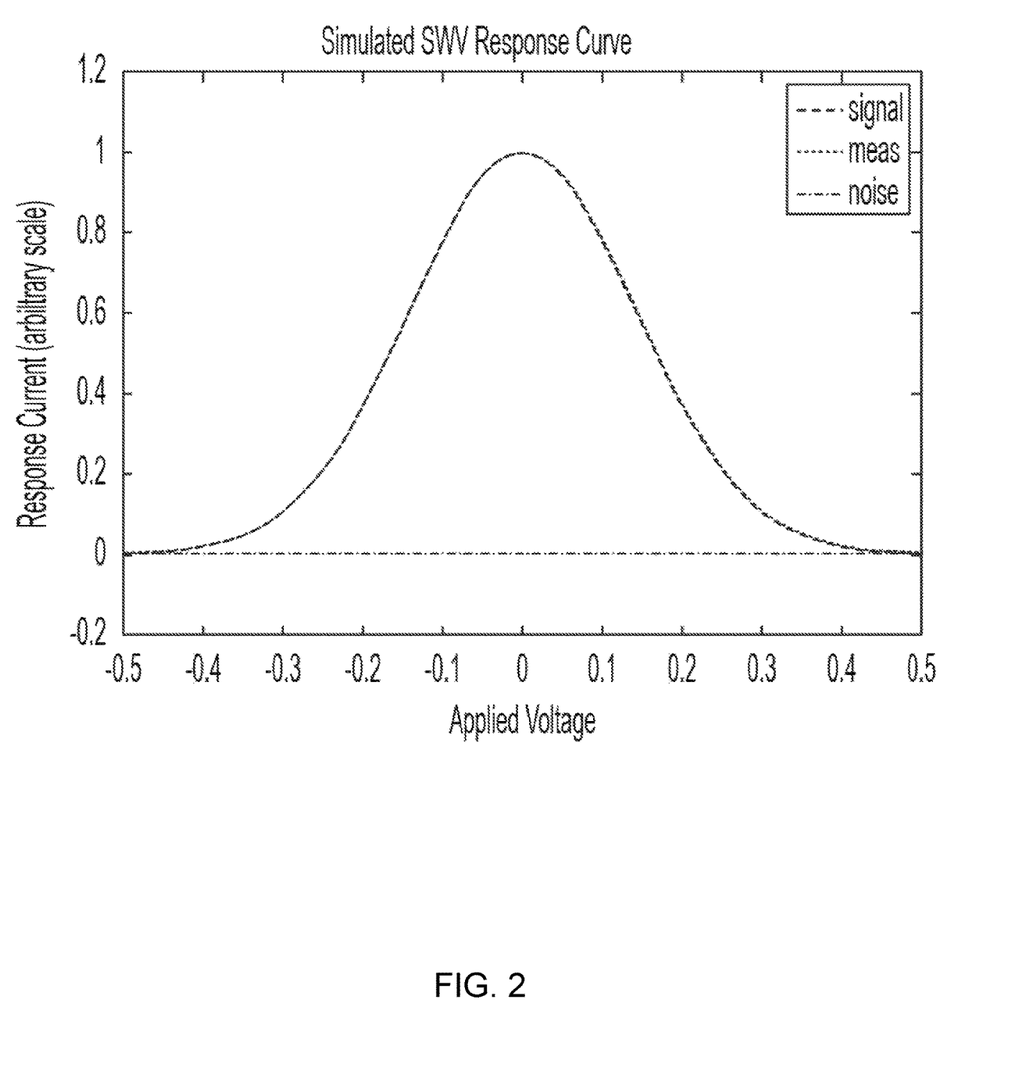

As explained above, square wave modulation frequency may be chosen in fixed relation to the frequency of the AC power grid to reduce the possibility of sensitive SWV measurements being corrupted by induced line noise. Likewise, in SCV mode, the length of each acquisition window is ideally equal to a fixed multiple of the AC line period. Consequently, step duration or modulation frequency are no longer free parameters, but are constrained to a discrete set of values. For conventional SWV to reject power line interference, the chosen modulation frequency must be one-half of the power line frequency or some integer sub-multiple thereof. In a conventional instrument, higher modulation frequencies cannot be used without compromising AC line immunity if a repeated cycle square wave voltammetry protocol is not used.

The restrictions noted above may become a burdensome limitation when studying certain classes of surface-bound reactions in which the reactive species are exhausted very quickly. A knowledgeable and skilled laboratory analyst may program a potentiostat with a fast enough modulation frequency that the current responses can be measured before they decay. But in the presence of line-related interference, this cannot be done without compromising the measurement integrity unless the protocol uses repeated cycle square wave voltammetry.

In Repeated Cycle Square Wave Voltammetry, each single cycle of a conventional SWV voltage excitation may be replaced by an integer number, r, of shorter cycles such that the total duration of these repeated cycles is equal to the period of the original single cycle, ideally an even integer number, k, of power line cycles. A single square wave cycle of conventional SWV may be replaced by several shorter square wave cycles in Repeated Cycle SWV. A time interval may be selected to facilitate AC line rejection.

As the modulation period shrinks, it may be desirable to increase the fraction of each half-cycle used for the acquisition window in order to retain better rejection of high-frequency interference. In an embodiment, higher frequency noise unrelated to power line noise may be rejected as a longer acquisition window reduces the "noise bandwidth." Repeated Cycle Square Wave Voltammetry is described in related application referenced above, which is incorporated here by reference.

Figure 3:
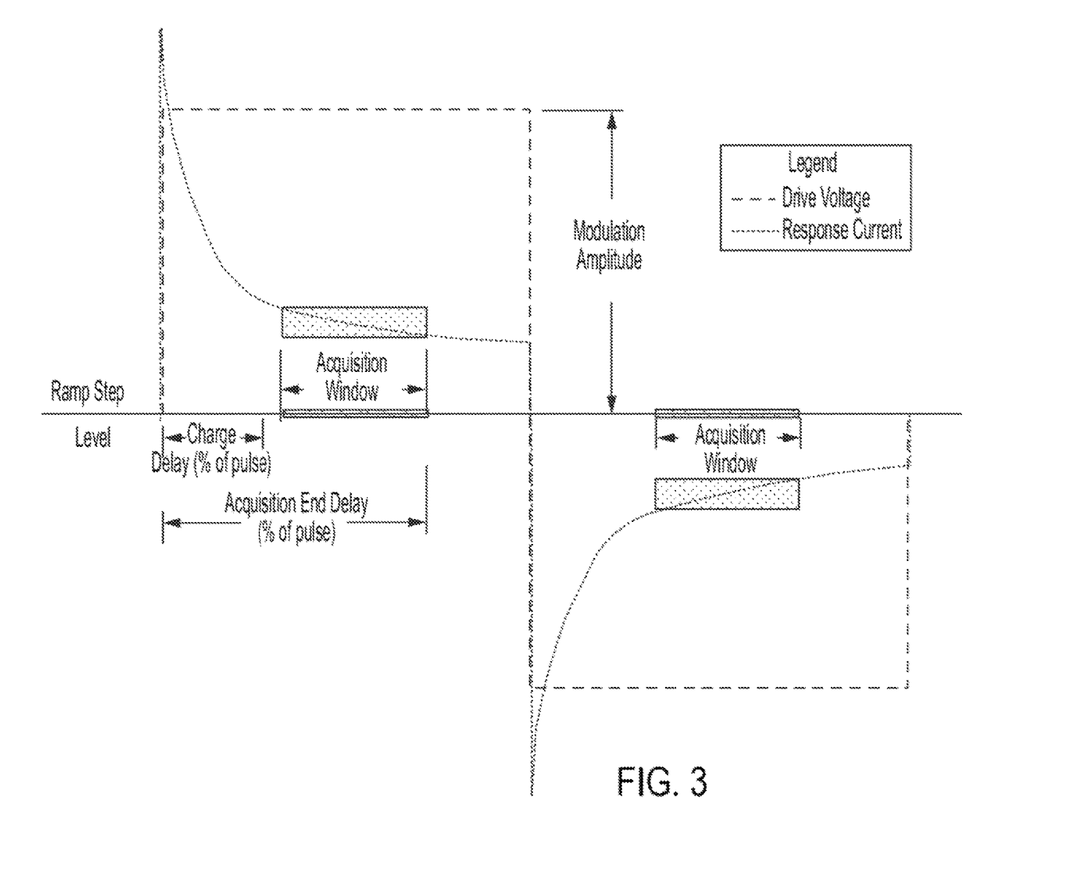
FIG. 3 illustrates an example single square wave cycle with excitation (top) and response (bottom) waveforms with acquisition windows for positive and negative half-cycles.

Referring to FIG. 3, in an embodiment, an example current output is illustrated. For example, a forward and a backward current is shown corresponding to a forward and backward voltage perturbation around the bias voltage of a voltammetric electrode. In an embodiment, a portion of the current output is used to determine the current. This may be referred to as an acquisition window. An acquisition window may be set for the forward, backward, or both the forward and backward current. As an example, the portion used is depicted as a highlighted portion of the current trace. The acquisition window may occure after a charge delay. The addition of the charge delay and acquisition window may be referred to as an acquisition end delay. The windows, delays, or the like may be expressed as a percentage of the resulting current from a voltage step as described herein. Other durations or intervals may be used for measurement, and the illustrated trace is an example. In this manner, the method and system may measure a current. An acquisition window may be adjusted to a start and end time depending upon an analyte to be measured, which may be based upon the current response for the given analyte in an aqueous sample.

Figure 4:
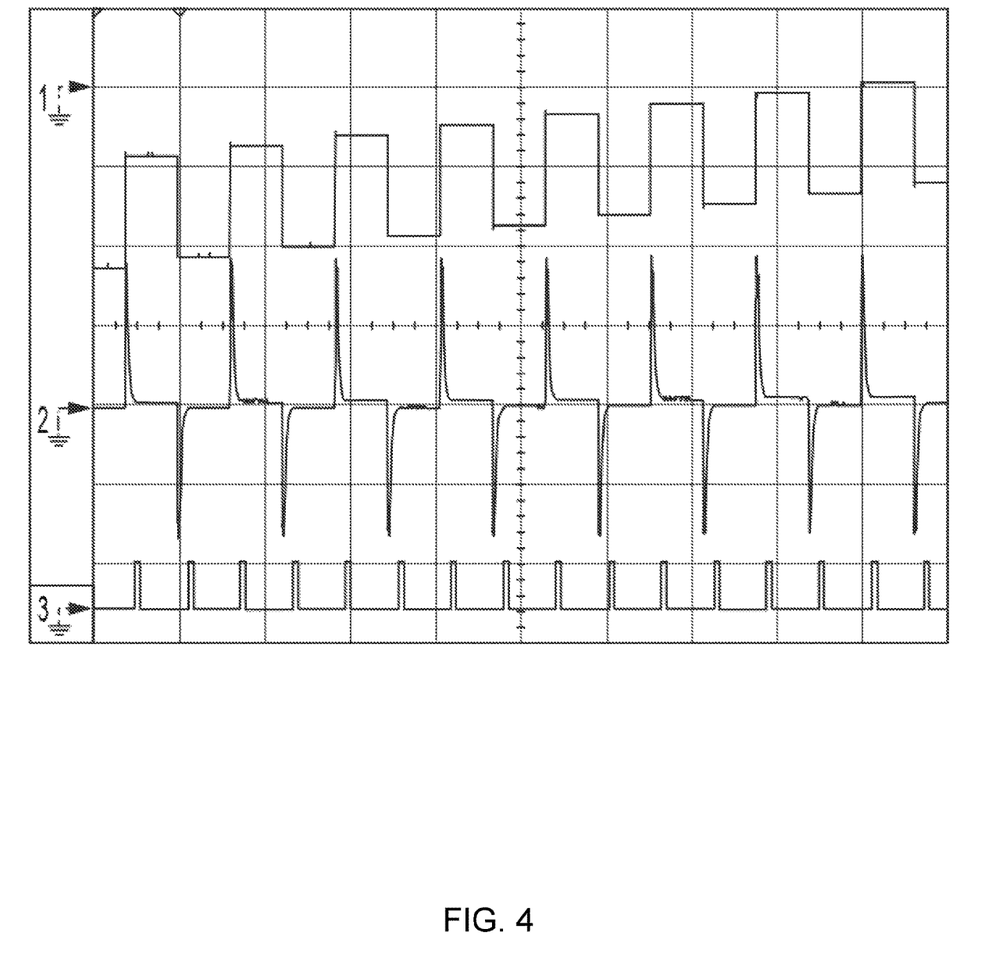
FIG. 4 illustrates an example oscilloscope capture with a square wave drive (top), response current (middle), and gating signal (bottom) for a 20% to 30% acquisition window.

Referring to FIG. 4, in an embodiment, an example oscilloscope capture is illustrated. An example square wave drive (top), response current (middle), and a gating signal for a 20% to 30% acquisition window is shown.

Figure 5:
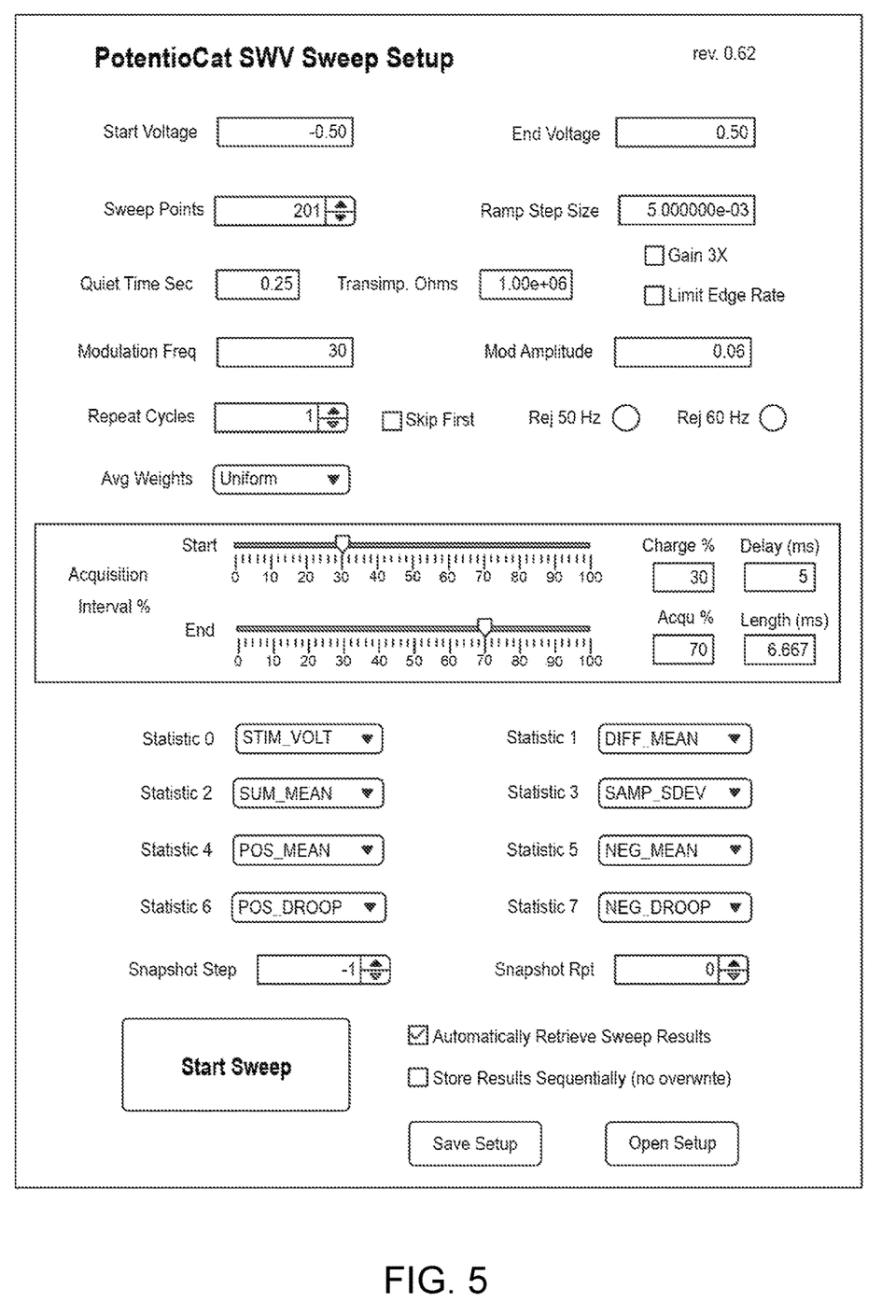
FIG. 5 illustrates an example control panel for a square wave voltammetry instrument according to this invention.

Referring to FIG. 5, in an embodiment, a sample graphical user interface (GUI) is illustrated. The user, system, or the like may set parameters described herein for a specifical use case scenario.

Figure 6:
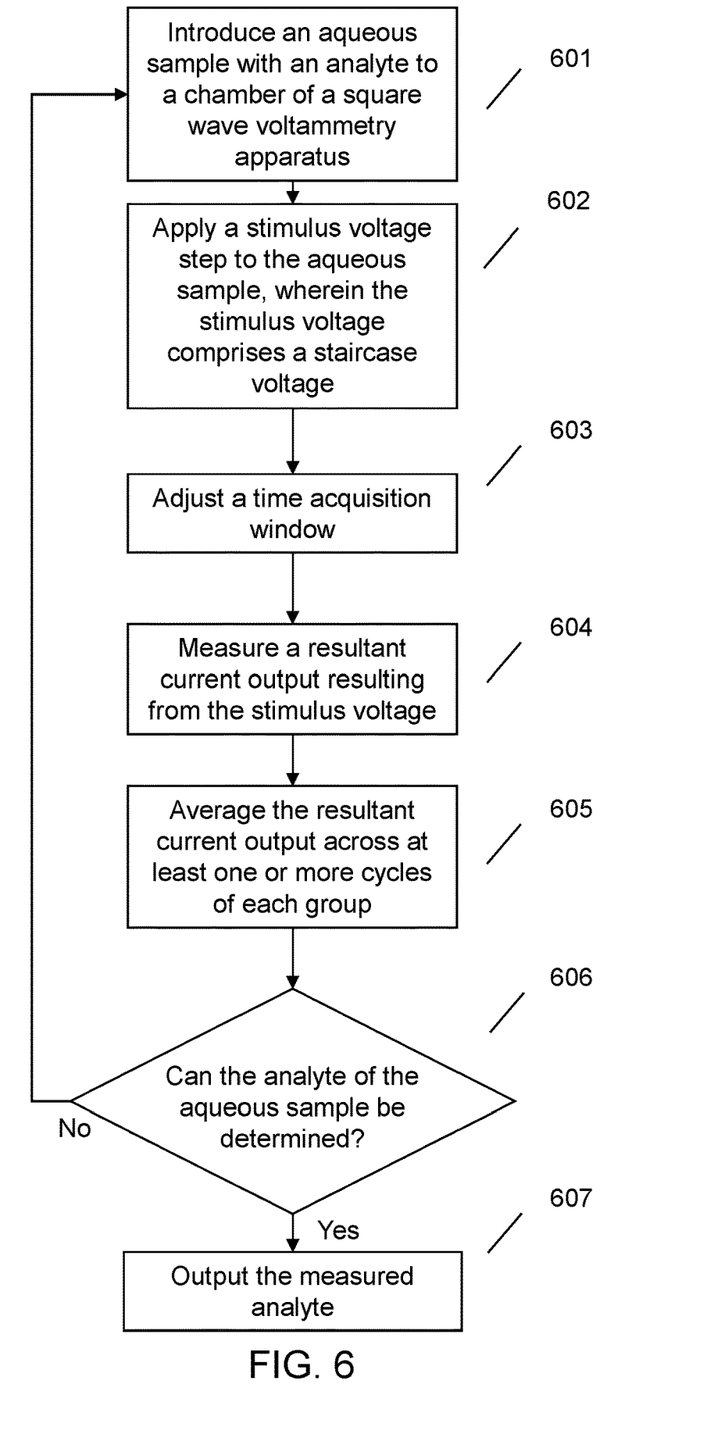
FIG. 6 illustrates flow diagram of measuring a component in an aqueous sample using square wave voltammetry.

Referring to FIG. 6, an embodiment may measure an analyte of a sample. In an embodiment, an acquisition window timing may be set by a user prior to initiating the measurement. The analyte may be any ion, component, or characteristic of the sample. At 601, in an embodiment, an aqueous sample may be introduced into a sample chamber or region. The aqueous sample may be placed or introduced into a test chamber manually by a user or using a mechanical means, for example, gravity flow, a pump, pressure, fluid flow, or the like. For example, a water sample for testing may be introduced to a chamber by a pump. In an embodiment, there may be one or more chambers in which the one or more method steps may be performed. In an embodiment, valves or the like may control the influx and efflux of the aqueous solution into or out of the one or more chambers, if present. Once the sample is introduced to the measurement system, the system may measure the analyte or characteristic of the sample.

At 602, in an embodiment, the system and method may apply a stimulus voltage step to the aqueous sample, wherein the stimulus voltage comprises a staircase voltage, wherein each step of the staircase voltage defines a group and comprises two or more repeated square wave modulations of equal or like voltage amplitude. At 603, the method or system may adjust a time acquisition window. There may be a time acquisition window both a forward and a reverse potential. A time acquisition may be adjusted for all repeat cycles, or each of the voltage steps within a group or a staircase protocol. A time acquisition window may be expressed as a percentage of the total voltage step.

At 604, in an embodiment, the system and method may measure a resultant current output resulting from the stimulus voltage, wherein the measuring comprises square wave voltammetry. At 605, in an embodiment, the system and method may average the resultant current output across at least one cycle of each group. Further details and structures related to the step are described in the referenced patent application.

The combination of one or more stairstep treads and additive square wave modulations, defining a complete voltage excitation waveform, may be referred to as an electrical signal. The electrical signal may be applied using one or more electrodes, for example, a series of electrodes. Electrodes may include a working electrode, counter (auxiliary) electrode, reference electrode, or the like. In an embodiment, the electrode may comprise a pH sensitive voltammetric electrode. In an embodiment, the one or more series of electrodes may be boron doped diamond (BDD) electrodes. Other electrode material are disclosed and contemplated. The use of BDD may serve as a better electrode material than other carbon-based or metallic materials (e.g., silver, gold, mercury, nickel, etc.) because these materials may eventually themselves become oxidized, thereby generating interfering signals and contributing to the errors in a measurement. The one or more electrode may be operatively coupled to electrical circuitry described herein and/or to any square wave voltammetry circuitry. Such circuitry may allow for delivery of voltage protocols, receiving current responses, data collection, filtering, weighting, averaging, storage, output, or the like.

In an embodiment, the electrodes may be fully or at least partially disposed in the volume of aqueous solution or sample. For example, if the aqueous solution is introduced into a chamber having one or more electrodes, the aqueous solution may at least partially cover the one or more electrodes. As another example, the one or more electrodes may be partially disposed within the chamber with the other portion of the electrode outside the chamber. Thus, when the aqueous solution is introduced into the chamber it only covers the portion of the electrodes that are within the chamber.

The method and system, at 606, may determine an analyte, analyte concentration, or characteristic of the sample. This determination may be made based upon previous voltage steps and resultant current from the method or system.

If, however, the analyte or characteristic may be determined at 606, the system, at 607, may output a characteristic, ionic concentration of an analyte, or the like of the aqueous sample. In an embodiment, an output may be in the form of a display, storing the data to a memory device, sending the output through a connected or wireless system, printing the output, or the like. The system may be automated, meaning the system may automatically output a result. The system may also have associated alarms, limits, or predetermined thresholds. For example, if a measured value reaches a threshold, the system may trigger an alarm, alert the system/personnel to a fault, alter the flow of the aqueous solution, or the like. Data may be analyzed in real-time, stored for later use, or any combination thereof.

In an embodiment, the stair case voltages may be controlled in real time by a processor. In an embodiment, the square wave modulation amplitude and other parameters may be set in advance. In an embodiment, the parameters that may be adjusted are illustrated in FIG. 5. In an embodiment, the timing of each cycle may be controlled by a "hardware state machine" rather than each edge being under direct control of the processor. Alternatively, some or all of the processing may be done using dedicated logic circuitry comprising a hardware state machine. These parameters may be controlled by a user, a set program, circuitry, processor, or the like. In an embodiment, in addition to the other hardware disclosed, primary interfaces between and processor and other elements may be I2C, SPI, and RS-485. These may be local serial buses and/or a serial field bus used between a measurement instrument and an external computer, which may include USB support.

The various embodiments described herein thus represent a technical improvement to conventional methods and instrument for square wave voltammetry. Using the techniques as described herein, an embodiment may use a method and device for an instrument for analyte measurement using square wave voltammetry. This is in contrast to conventional methods with limitations mentioned above.

Such techniques provide a better method to construct and an instrument for analyte measurement using square wave voltammetry.

Figure 7:
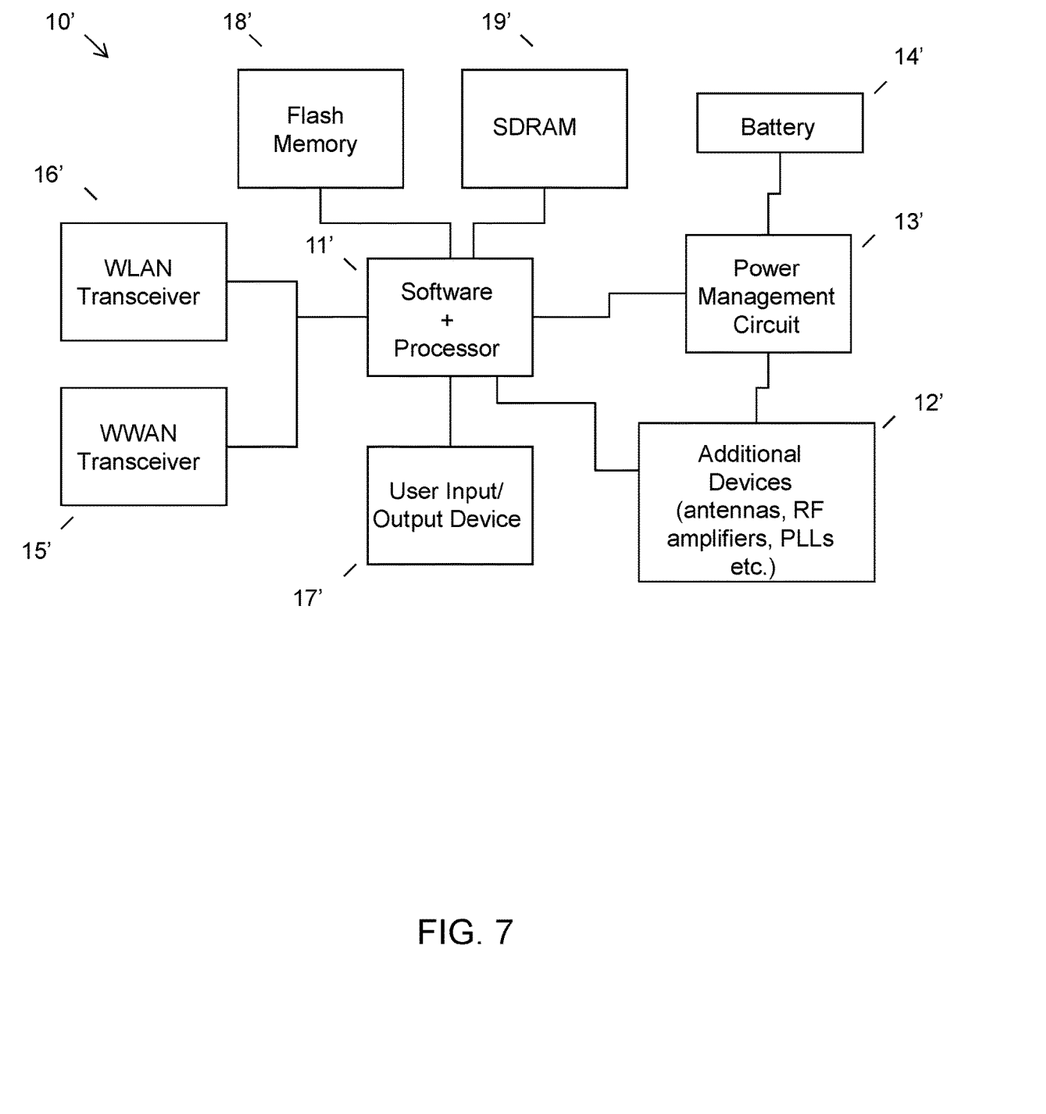
FIG. 7 illustrates an example of computer circuitry.

While various other circuits, circuitry or components may be utilized in information handling devices, with regard to an instrument for analyte measurement using square wave voltammetry according to any one of the various embodiments described herein, an example is illustrated in FIG. 7. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Common peripheral connection methods may include, for example, SPI and I2C. Higher-speed connection methods such as SDIO may be used, for instance, in communicating with Flash Memory.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment of an instrument for square wave voltammetry.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a measurement device such as illustrated in FIG. 7, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring a component of an aqueous sample using square wave modulation, comprising:
   introducing the aqueous sample to a chamber of a square wave modulation apparatus;
   applying a stimulus voltage step to the aqueous sample, wherein the stimulus voltage comprises a staircase voltage, wherein each step of the staircase voltage defines a group, wherein the group comprises one or more square wave modulation cycles;
   adjusting a time acquisition window, wherein the time acquisition window is a portion of each of the half cycle of the stimulus voltage;
   measuring a resultant current output resulting from the stimulus voltage within the time acquisition windows, wherein the average resultant current output is directly proportional to the amount of component of an aqueous solution; and averaging the resultant current output across at least one or more cycles of each group.

2. The method of claim 1, wherein the averaging comprises a uniform weighting of each group within the time acquisition window.

3. The method of claim 1, wherein the averaging comprises a non-uniform weighting of each group within the time acquisition window.

4. The method of claim 3, wherein the averaging further comprises selecting the non-uniform weighting to achieve a desired frequency response.

5. The method of claim 1, wherein a single square wave cycle protocol is used per ramp step.

6. The method of claim 1, wherein a plurality of response current measurements are measured at an equal time spacing within the acquisition window.

7. The method of claim 1, wherein the length of the averaged cycles in a modulation group is equal to the length of an integer number of power source cycles.

8. The method of claim 1, wherein a duration of the acquisition window is equal to an integer number of power source cycles.

9. The method of claim 1, wherein a start time and an end time of the acquisition window are selected to advantage a response for an ionic species measured in the aqueous sample.

10. The method of claim 1, wherein the stimulus voltage step comprises a repeated cycle square wave voltammetry protocol.

11. A device for measuring a component of an aqueous sample using square wave modulation, comprising:
a voltammetric electrode;
at least one reference electrode;
at least one counter electrode; and
a memory storing instructions executable by a processor to:
apply a stimulus voltage step to the aqueous sample, wherein the stimulus voltage comprises a staircase voltage, wherein each step of the staircase voltage defines a group, wherein the group comprises one or more square wave modulation cycles;
adjusting a time acquisition window, wherein the time acquisition window is a portion of each of the half cycle of the stimulus voltage;
measure a resultant current output resulting from the stimulus voltage within the time acquisition windows, wherein the average resultant current output is directly proportional to the amount of component of an aqueous solution; and
average the resultant current output across at least one or more cycles of each group.

12. The device of claim 11, wherein the averaging comprises a uniform weighting of each group within the time acquisition window.

13. The device of claim 11, wherein the averaging comprises a non-uniform weighting of each group within the time acquisition window.

14. The device of claim 13, wherein the averaging further comprises selecting the non-uniform weighting to achieve a desired frequency response.

15. The device of claim 11, wherein a single square wave cycle protocol is used per ramp step.

16. The device of claim 11, wherein a plurality of response current measurements are measured at an equal time spacing within the acquisition window.

17. The device of claim 11, wherein the length of the averaged cycles in a modulation group is equal to the length of an integer number of power source cycles.

18. The device of claim 11, wherein a duration of the acquisition window is equal to an integer number of power source cycles.

19. The device of claim 11, wherein a start time and an end time of the acquisition window are selected to advantage a response for an ionic species measured in the aqueous sample.

20. A system for measuring a component of an aqueous sample using square wave modulation, comprising:
a voltammetric electrode;
at least one reference electrode;
at least one counter electrode; and
a storage device having code stored therewith, the code being executable by the processor and comprising:
code that applies a stimulus voltage step to the aqueous sample, wherein the stimulus voltage comprises a staircase voltage, wherein each step of the staircase voltage defines a group, wherein the group comprises one or more square wave modulation cycles;
code that adjusts a time acquisition window, wherein the time acquisition window is a portion of each of the half cycle of the stimulus voltage;
code that measures a resultant current output resulting from the stimulus voltage within the time acquisition windows, wherein the average resultant current output is directly proportional to the amount of component of an aqueous solution; and
code that averages the resultant current output across at least one cycle of each group.

* * * * *